United States Patent
Gill et al.

(10) Patent No.: US 9,319,401 B2
(45) Date of Patent: Apr. 19, 2016

(54) SYSTEM AND METHOD FOR CROSS-CHANNEL AUTHENTICATION

(71) Applicant: Bank of America Corporation, Charlotte, NC (US)

(72) Inventors: Davindar S. Gill, Long Grove, IL (US); Therese H. Willis, Apopka, FL (US); Lekha Ananthakrishnan, Charlotte, NC (US); Eileen D. Bridges, Fort Mill, SC (US); Francis G. Farro, II, Orlando, FL (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/164,774

(22) Filed: Jan. 27, 2014

(65) Prior Publication Data

US 2015/0215310 A1 Jul. 30, 2015

(51) Int. Cl.
*H04L 9/32* (2006.01)
*H04L 29/06* (2006.01)
*G06F 21/43* (2013.01)

(52) U.S. Cl.
CPC ............ *H04L 63/0853* (2013.01); *G06F 21/43* (2013.01); *H04L 63/0838* (2013.01)

(58) Field of Classification Search
CPC .......................... H04L 63/067; H04L 9/0863
See application file for complete search history.

(56) References Cited

U.S. PATENT DOCUMENTS

| | | | |
|---|---|---|---|
| 2009/0024506 A1* | 1/2009 | Houri ................. | G06Q 40/00 705/35 |
| 2011/0016047 A1* | 1/2011 | Wu .................... | G06Q 20/1085 705/43 |
| 2011/0082767 A1* | 4/2011 | Ryu et al. .................... 705/26.35 |
| 2013/0145449 A1* | 6/2013 | Busser et al. ...................... 726/7 |
| 2013/0159445 A1* | 6/2013 | Zonka et al. .................. 709/206 |
| 2013/0198519 A1* | 8/2013 | Marien ......................... 713/172 |
| 2013/0225128 A1* | 8/2013 | Gomar .......................... 455/411 |
| 2014/0156528 A1* | 6/2014 | Frechette ........................ 705/44 |
| 2014/0201517 A1* | 7/2014 | Corrion .............. | H04L 63/0838 713/155 |
| 2015/0227731 A1* | 8/2015 | Grigg ...................... | G06F 21/31 726/7 |
| 2015/0310435 A1* | 10/2015 | Choudhary .......... | G06Q 20/206 705/44 |

* cited by examiner

OTHER PUBLICATIONS

"Paydiant wins patent for smartphone-ATM transaction solution,"—http://www.atmmarketplace.com/article/226635/Paydiant-wins-patent-for-smartphone-ATM-transaction-solution?utm_source=NetWorld%20Alliance&utm_medium=email&utm_campaign=EMNAAMC01242014; ATM Marketplace Home; 3 pages.

*Primary Examiner* — Josnel Jeudy
(74) *Attorney, Agent, or Firm* — Michael A. Springs

(57) ABSTRACT

A system may include a memory and processor. The memory may store a user account identifier associated with a user account. The processor may be able to receive at least one user credential and authenticate the user account based at least in part on the at least one user credential. The processor may also receive a first request, from a device associated with the user account, to generate a one-time password and generate the one-time password in response to receiving the first request. The processor may associate the one-time password to the user account and communicate the one-time password to the device associated with the user account. The processor is further able to receive a second request, from a transaction device, the second request comprising an attempted one-time password, determine whether the attempted one-time password is valid and communicate, to the transaction device, an indication that the attempted one-time password is valid in response to determining that the attempted one-time password is valid.

20 Claims, 3 Drawing Sheets

SYSTEM AND METHOD FOR CROSS-CHANNEL AUTHENTICATION

TECHNICAL FIELD OF THE INVENTION

This invention relates generally to user authentication and, more specifically, to a system and method for cross-channel authentication for financial transactions.

BACKGROUND OF THE INVENTION

Enterprises handle a large number of customer transactions on a daily basis. New methods of conducting transactions become available as technology advances. For some customers, it may be desirable to conduct transactions using a mobile device, such as a smart phone device.

SUMMARY OF THE INVENTION

According to embodiments of the present disclosure, disadvantages and problems associated with previous authentication systems may be reduced or eliminated.

In certain embodiments, a system includes a memory and a processor. The memory may store a user account identifier associated with a user account. The processor may be communicatively coupled to the memory and may cause the system to receive at least one user credential and authenticate the user account based at least in part on the at least one user credential. The processor may also receive a first request, from a device associated with the user account, to generate a one-time password and generate the one-time password in response to receiving the first request. The processor may associate the one-time password to the user account and communicate the one-time password to the device associated with the user account. The processor is further able to receive a second request, from a transaction device, the second request comprising an attempted one-time password, determine whether the attempted one-time password is valid and communicate, to the transaction device, an indication that the attempted one-time password is valid in response to determining that the attempted one-time password is valid.

Particular embodiments of the present disclosure may provide some, none, or all of the following technical advantages. In certain embodiments, components of the system may initiate a large number of authentication requests without requiring the user to swipe an identification card, bank card, check card, credit card, or any other card that may be used to authenticate a user, thereby allowing increased efficiency and the reduction in the use of card readers for processing.

In another embodiment, components of the system can obtain information associated with a user from a centralized location rather than processing identification cards and communicating information necessary for the processing of the cards, thereby reducing the computation resources and bandwidth consumed by attempting to obtain such information from traditional physical cards.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

For a more complete understanding of the present disclosure and its advantages, reference is made to the following descriptions, taken in conjunction with the accompanying drawings in which.

DETAILED DESCRIPTION OF THE INVENTION

Figure 1:
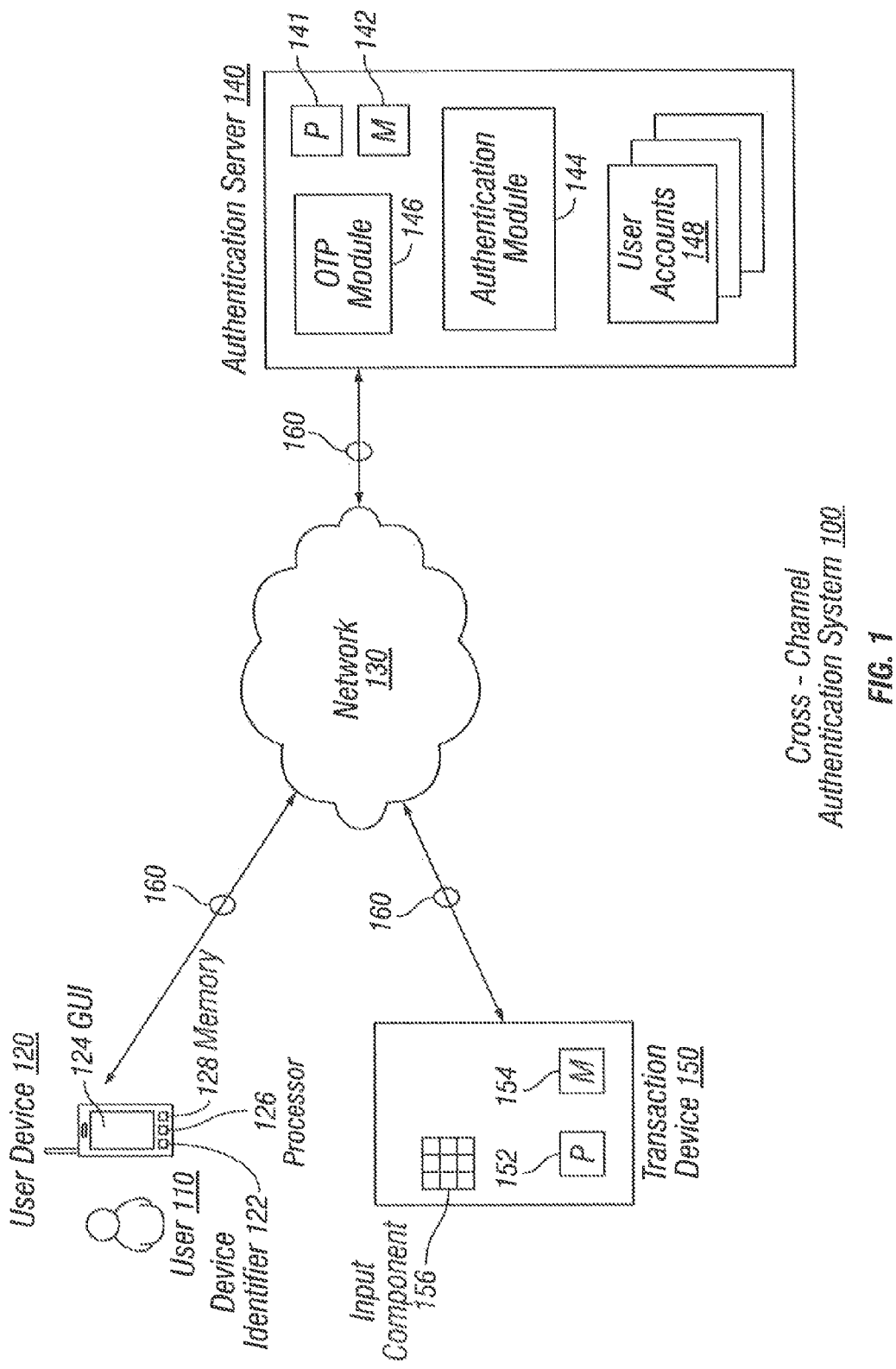
FIG. 1 illustrates an example cross-channel authentication system.
Figure 2:
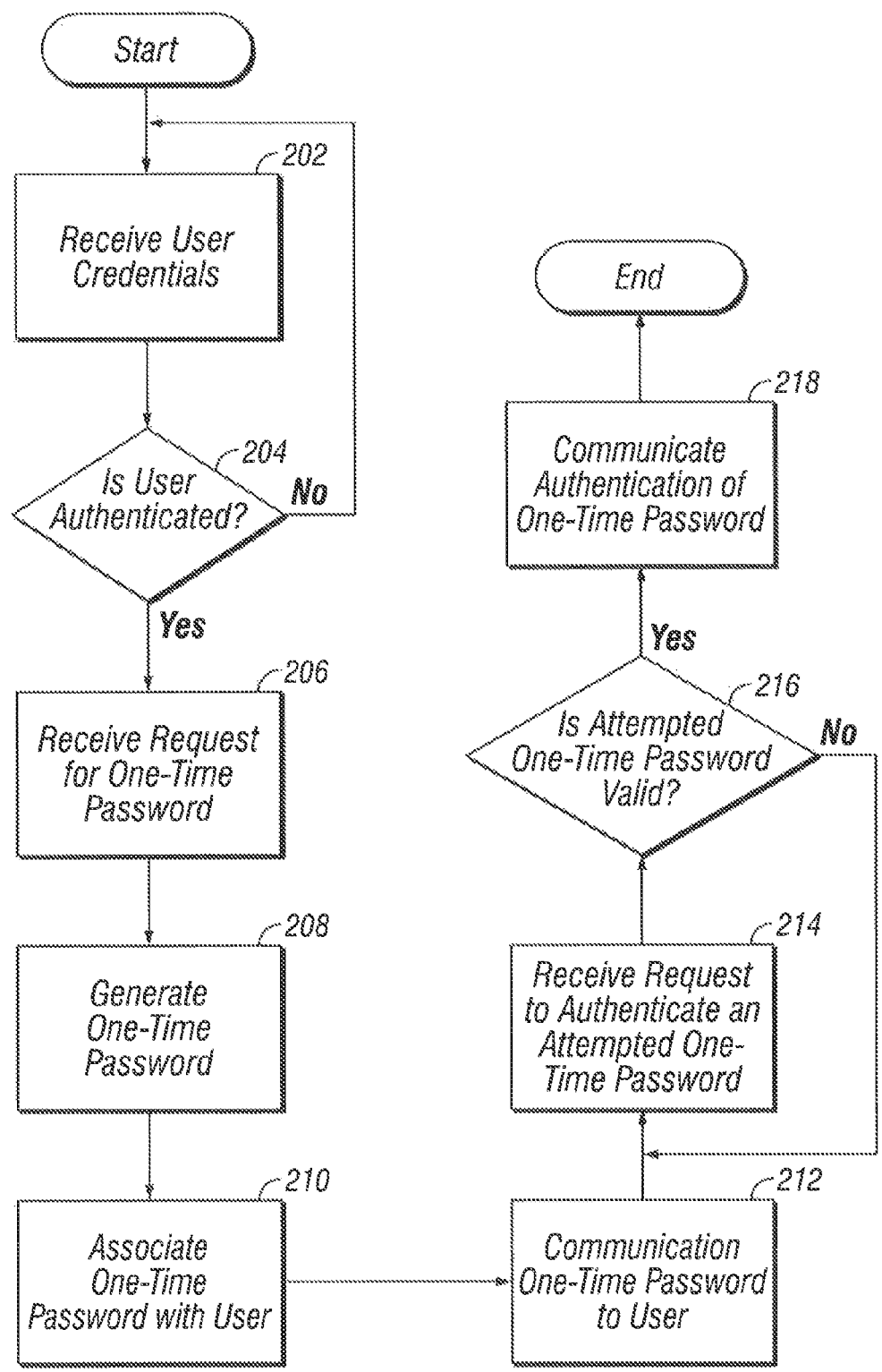
FIG. 2 illustrates an example method for cross-channel authentication, which may be performed by the example system of FIG. 1 to authenticate a user, according to certain embodiments of the present disclosure.
Figure 3:
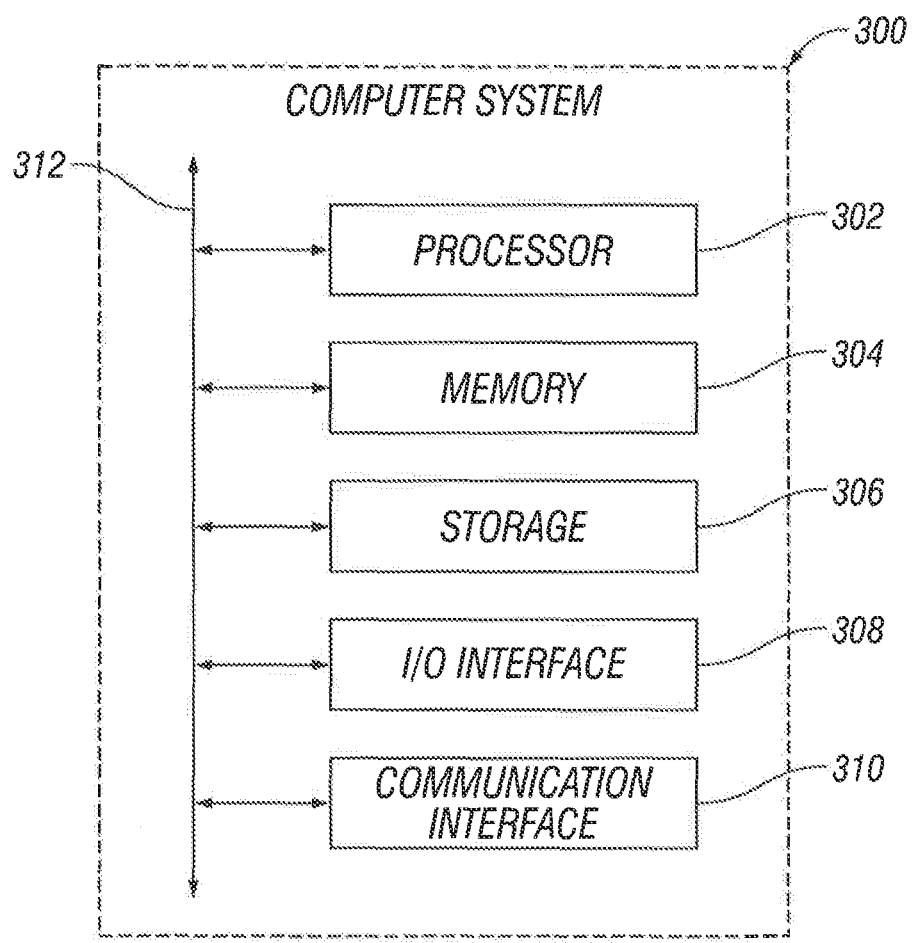
FIG. 3 illustrates an example computer system.

Certain embodiments of the present disclosure provide techniques for authenticating a user using cross-channel authentication. FIGS. 1 through 3 below illustrate systems and methods for authenticating a user using cross-channel authentication.

FIG. 1 illustrates an example cross-channel authentication system 100 according to certain embodiments. In general, cross-channel authentication is used by enterprises, such as financial institutions, to authenticate a customer across one channel and then allowing the customer to leverage that authentication into authentication for a transaction in another channel. For example, the first channel of authentication may be the customer entering user credentials into an application in a mobile device application. In response, the customer may receive a one-time password that the customer can then use to be authenticated across a second channel such as an automated teller machine (ATM), point-of-sale device (POS), kiosk, or over the phone and/or Internet. The one-time password is a single use password that a previously authenticated user 110 may use to indicate to an enterprise that the particular user 110 has already been authenticated by the enterprise. Cross-channel authentication system 100 is capable of accommodating a large variety of transactions, such as transactions at an ATM, at a physical banking center, scheduling an appointment with an advisor, a transaction over the phone, or any other suitable transaction.

In particular, cross-channel authentication system 100 comprises user device 120, network 130, authentication server 140, and transaction device 150. User device 120 is any device user 110 may use for authentication by an enterprise. User device 120 is a device operable to communicate wirelessly with network 130, transaction device 150, other user devices 120, authentication server 140, or any other suitable components of cross-channel authentication system 100. For example, user device 120 may be a laptop computer, personal digital assistant (PDA), cellular phone, tablet, portable media player, smart device, or any other device capable of wireless communication. In certain embodiments, user device 120 may include one or more processors 126, one or more memories 128, one or more displays, one or more interfaces, one or more components capable of inputting data, one or more components capable of outputting data, one or more components capable of communicating with any other component of cross-channel authentication system 100, or any other component suitable for a particular purpose.

Processor 126 may include one or more microprocessors, controllers, or any other suitable computing devices or resources. Processor 126 may work, either alone or with components of cross-channel authentication system 100, to provide a portion or all of the functionality of cross-channel authentication system 100 described herein.

Processor 126 communicatively couples to memory 128. Memory 128 may take the form of volatile or non-volatile memory including, without limitation, magnetic media, optical media, Random Access Memory (RAM), Read Only Memory (ROM), removable media, or any other suitable memory component. In certain embodiments, a portion or all of memory 128 may store one or more database data structures, such as one or more structured query language (SQL) servers or relational databases.

In certain embodiments, memory 128 may be internal or external to processor 126 and may include one or more instruction caches or one or more data caches. Instructions in the instruction caches may be copies of instructions in memory 128, and the instruction caches may speed up retrieval of those instructions by processor 126. Data in the data caches may include any suitable combination of copies of data in memory 128 for instructions executing at processor 126 to operate on, the results of previous instructions executed at processor 126 for access by subsequent instructions executing at processor 126, or for writing to memory 128, and/or any other suitable data. The data caches may speed up read or write operations by processor 126.

According to certain embodiments, user device 120 may include user device identifier 122. User device identifier 122 is a unique identifier for user device 120 that allows cross-channel authentication system 100 to differentiate a particular user device 120 from a different user device 120. For example, user device identifier 122 may be an alphanumeric string stored in memory 128 of user device 120. In certain embodiments, user device 120 may be operable to communicate with various components of cross-channel authentication system 100 via a short range wireless communications protocol such as Bluetooth®, a near field communications (NFC) protocol, or a radio frequency identification (RFID) protocol.

In some embodiments, user device 120 also may comprise graphical user interface (GUI) 124. GUI 124 is generally operable to tailor and filter data presented to user 110. GUI 124 may provide user 110 with an efficient and user-friendly presentation of information regarding the functionality of user device 110. GUI 124 may comprise a plurality of displays having interactive fields, pull-down lists, and buttons operated by user 110. GUI 124 may include multiple levels of abstraction including groups and boundaries. In certain embodiments, GUI 124 may comprise a web browser. In another embodiment, GUI 124 may comprise a graphical representation of a mobile application.

User device 120 may communicate with any other component of cross-channel authentication system 100 over network 130. This disclosure contemplates any suitable network 130. As an example and not by way of limitation, one or more portions of network 130 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 130 may include one or more networks 130.

In some embodiments, components of cross-channel authentication system 100 may be configured to communicate over links 160. Communication over links 160 may request and/or send information about any suitable component of cross-channel authentication system 100. Links 160 may connect user device 120, authentication server 140, and transaction device 150 to network 130 or to each other. This disclosure contemplates any suitable links 160. In particular embodiments, one or more links 160 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 160 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 160, or a combination of two or more such links 160. Links 160 need not necessarily be the same throughout cross-channel authentication system 100. One or more first links 160 may differ in one or more respects from one or more second links 160.

Cross-channel authentication system may also include transaction device 150. Generally, user 110 may decide to participate in a transaction that involves transaction device 150. Instead of entering user credentials once again into transaction device 150, user 110 may use a generated one-time password that indicates to transaction device 150 that user 110 has previously been authenticated by the enterprise. For example, transaction device 150 may be an automated teller machine (ATM), a point-of-sale device, a kiosk, a mobile device, a tablet device, a general purpose computer operated by an enterprise employee, or any other device suitable for a particular purpose. More specifically, transaction device 150 may be any device capable of prompting user 110 for information that may be used to authenticate user 110. In certain embodiments, transaction device 150 may comprise processor 152, memory 154, and input component 156. Processor 152 and memory 154 may essentially be structured and operate similarly to processor 126 and memory 123 described above.

Transaction device 150 may include input component 156 which may be any hardware, software, firmware, or combination thereof that allows for a one-time password to be entered into transaction device 150. For example, input component 156 may comprise a video camera, an image capture device, a scanner, a microphone, a keypad, a mouse, a touch screen, and/or any other component that may allow the entry of a one-time password. In certain embodiments, input component 156 may be a keypad or keyboard (or a representation thereof on an electronic touchscreen display) that allows user 110, or an employee of the enterprise on the behalf of user 110, to input a one-time password. For example, user 110 may use a keypad on an ATM to enter a one-time password or speak the one-time password to an enterprise employee who may use a keypad or keyboard to enter the one-time password. As another example, user 110 may enter a one-time password on a keypad presented on the touch screen of a kiosk or tablet device associated with an enterprise.

In other embodiments, user 110 may have received an image file representing a one-time password and may display that image file using user device 120. In this embodiment, user 110 may hold user device 120 up to or near input component 156 (which may comprise a camera or a scanner) allowing input component 156 to capture, record, or otherwise receive information from the image file. Once information is received by input component 156, transaction device 150 may process the information further to convert or decode the information into machine-readable data. Transaction device 150 may communicate the information or data captured by input component 156 to authentication server 140 via link 160 over network 130.

Generally, authentication server 140 may authenticate a particular user 110, generate one-time passwords, and verify attempted one-time passwords. More specifically, authentication server 140 may include processor 141, memory 142, authentication module 144, one-time password module 146, and user accounts 148. Processor 141 may include one or more microprocessors, controllers, or any other suitable computing devices or resources. Processor 141 may work, either alone or with components of cross-channel authentication system 100, to provide a portion or all of the functionality of cross-channel authentication system 100 described herein. Processor 141 communicatively couples to memory 142. Memory 142 may take the form of volatile or non-volatile memory including, without limitation, magnetic media, optical media, RAM, ROM, removable media, or any other suitable memory component.

In certain embodiments, memory 142 may be internal or external to processor 141 and may include one or more instruction caches or one or more data caches. Instructions in the instruction caches may be copies of instructions in memory 142, and the instruction caches may speed up retrieval of those instructions by processor 141. Data in the data caches may include any suitable combination of copies of data in memory 142 for instructions executing at processor 141 to operate on, the results of previous instructions executed at processor 141 for access by subsequent instructions executing at processor 141, or for writing to memory 142, and other suitable data. The data caches may speed up read or write operations by processor 141.

Authentication server 140 may use authentication module 144 to authenticate user 110 according to any one of a variety of embodiments as suitable for a particular purpose. Authentication module 144 may be any software, hardware, firmware, or combination thereof capable of authenticating users 110. In certain embodiments, authentication module 144 may be a set of instructions stored in memory 142 that may be executed by processor 141. Particularly, in response to a request received from user device 120 or transaction device 150 over link 160, authentication module 144 may use processor 141 and memory 142 to initiate the authentication of user 110. Using the information communicated over link 160, authentication module 144 may retrieve a particular user account 148.

For example, authentication module 144 may use a unique identifier of user 110 to retrieve a particular user account 148. In certain embodiments, user accounts 148 may be stored in memory 142. In certain embodiments user accounts 148 may be stored in one or more text files, tables in a relational database, or any other suitable data structure capable of storing information. Each user account 148 may be associated with a user 110. In certain embodiments, user account 148 may contain information that authentication module 144 may use to compare against the information included in a message received over link 160. For example, user account 148 may include or the associated with a unique identifier for user 110, user device identifier 122, authorization preferences for user 110, user credentials or a result of some function applied to user credentials, one or more one-time passwords and/or any other information useful for authenticating user 110.

Authentication module 144 may compare the user credentials included in the received request against the user credentials contained in the particular user account 148. If the user credentials of the request do not match the user credentials included in the particular user account 148, authentication module 144 may communicate a message via link 160 over network 130 to user device 120 and/or transaction device 150. The message may contain an indication that authentication of user 110 has failed. It should be understood when a user credential is discussed in any particular embodiment, the user credential may be the actual user credential or it may be a result of some function(s) applied to the user credential. Cross-channel authentication system 100 is capable of storing, accessing, communicating, comparing, and/or processing user credentials (and derivatives thereof) in any suitable format according to particular needs. For example, authentication module 144 may compare the actual user credentials or authentication module 144 may compare a hash value of the user credentials in the particular user account 148 with a hash value of the user credentials included in the received request to authenticate.

As another example, authentication server 140 may receive a request via link 160 over network 130 to verify an attempted one-time password. In particular, an attempted one-time password may have been entered into transaction device 150. In response, transaction device 150 may communicate the request to verify the attempted one-time password. In some embodiments, the request may contain the attempted one-time password. For example, the attempted one-time password included in the request may comprise an alphanumeric string, a quick response code (QR code), a bar code, visual data, audio data, and/or any other data suitable for use as a one-time password. In such an embodiment, authentication module 144 may use processor 141 to further decode the one-time password before verifying the one-time password. In other embodiments, the request may comprise information associated with the one-time password. For example, the information may be data decoded from the attempted one-time password. According to some embodiments, the request may also include an attempted user identifier, an attempted mobile device identifier (e.g., a phone number), and/or any other data that may identify a requesting user 110 or requesting user device 120. Authentication module 144 may compare the information received in the request with information that may be associated with a particular user account 148. As an example, authentication module 144 may compare the attempted one-time password to a one-time password associated with a particular user account 148. In certain embodiments, authentication module 144 may also use a unique identifier included in the request, such as a phone number, to look up a particular user account 148 and determine whether the attempted one-time password matches the one-time password that is associated with the particular user account 148.

Authentication server 140 may also include one-time password module 146. Generally, authentication server 140 may use one-time password module 146 to generate one-time passwords. In particular, one-time password module 146 may be any software, hardware, firmware, or combination thereof capable of generating one-time passwords. In certain embodiments, one-time password module 146 may be a set of instructions stored in memory 142 that may be executed by processor 141. For example, one-time password module 146 may generate an alphanumeric string that is unique to a particular user 110. The alphanumeric string may be generated randomly, quasi-randomly, or utilizing any security algorithm suitable for password generation.

According to some embodiments, one-time password module 146 may generate image files as one-time passwords. For example, machine-readable data may be encoded into a plurality of image components. The encoded data may convey information that facilitates the authentication of a particular user 110. As an example, the data may convey any suitable combination of information that may be associated with user account 148. In certain embodiments, the data may be unique to a particular user 110. One-time password module 146 may generate an image file using the encoded data. In some embodiments, the data encoded as a plurality of image components may be used to generate an image file that includes a machine-readable pattern of those image components. The pattern of image components may include, for example, geometric shapes, colors, and/or spacing between geometric shapes, which collectively represent the data encoded. In certain embodiments, the image file may include one or more barcodes, quick response codes, other code types, and/or any suitable combination thereof. Particular image files include content that may be printed or displayed on an electronic display. Once one-time password module 146 generates a one-time password, authentication server 140 may store one-time password 146 in memory 142. Additionally, authentication server 140 may associate the generated one-time password with a particular user account 148 for a particular user 110.

The operation of cross-channel authentication system 100 will now be discussed. Generally, user 110 may use the services provided by cross-channel authentication system. 100 to be authenticated via a first channel and then leverage that authentication to become authenticated in a second channel. More specifically, user 110 may use user device 120 to request to be authenticated by authentication server 140. For example, user 110 may use GUI 124 to enter user credentials into user device 120. In this example, user 110 may be using a mobile software application running on user device 120 to initiate authentication with an enterprise. User device 120 may communicate at least one user credential to authentication server 140 via link 160 over network 130. In response, authentication server 140 may use the received information to authenticate user 110. For example, authentication server 140 may use authentication module 144 to determine whether the information received from user device 120 is valid and user 110 may be authenticated, if the information is not valid, authentication server 140 may communicate a message via link 160 over network 130 to user device 120 indicating that user 110 is not authenticated and user 110 may re-enter user credentials. If the information is valid, authentication server 140 may communicate a message via link 160 over network 130 indicating that user 110 has been authenticated.

Once user 110 is authenticated, user 110 may request a one-time password in order to participate in a transaction using user device 120. In certain embodiments, user 110 may indicate the type of channel or transaction. For example, user 110 may select an ATM, physical banking location, over the phone support, or any other suitable channel type as the type of channel for the transaction. User device 120 may communicate user 110's request for a one-time password via link 160 over network 130 to authentication server 140. In certain embodiments, user device 120 may also include information that may identify user 110 or user device 120 in the request. In response to receiving the request, authentication server 140 may generate a one-time password. As an example, authentication server 140 may use one-time password module 146 to generate the requested one-time password. In certain embodiments, the one-time password may expire after a defined period of time. In some embodiments, the one-time password may not expire until it is used by user 110. Authentication server 140 may also associate the one-time password with the particular user 110. For example, authentication server 140 may do this by associating the one-time password to a particular user account 148 associated with user 110. Authentication server 140 may then communicate the one-time password to user device 120.

After receiving the one-time password, user 110 may desire to facilitate the transaction. For example, user 110 may indicate to transaction device 150 (either directly or via an employee of an enterprise) that user 110 has a one-time password that may authenticate user 110. User 110 may input the one-time password using input component 156 of transaction device 150. For example, user 110 may enter an alphanumeric string by typing on a keypad or may display a QR code on user device 120 that may be analyzed by a scanner or some other visual input device. As another example, user 110 may speak the one-time password to an employee of the enterprise that may confirm one-time password. In certain embodiments, additional information may be inputted into transaction device 150 that is associated with user 110. For example, information associated with user 110 or user device 120 may be entered into transaction device 150 such as a user identifier, device identifier, phone number, and/or any other information suitable for a particular purpose.

Once the attempted one-time password and any other additional information has been entered into transaction device 150, transaction device 150 may communicate this information as part of a request to authenticate a user 110 that is attempting to use the one-time password. The request may be communicated by transaction device 150 via link 160 over network 130 to authentication server 140. In certain embodiments, a digital image or video capture may be included in the communicated request. In other embodiments, the digital image or video capture may be processed into machine-readable data before being included in the communicated request. In response to receiving the request, authentication server 140 may determine whether the attempted one-time password is valid. In certain embodiments, authentication server 140 may use authentication module 144 to determine the validity of the attempted one-time password. If it is determined that the one-time password is not valid, authentication server 140 may communicate a message to transaction device 150 indicating that the one-time password is invalid. Transaction device 150 may, in response, prompt user 110 to input a valid one-time password. If it is determined that the one-time password is valid, authentication server 140 may communicate a message to transaction device via link 160 over network 130 indicating that the attempted one-time password is valid and that user 110 is authenticated.

Certain embodiments of the present disclosure may provide some, none, or all of the following technical advantages having specific technical effects. In certain embodiments, components of cross-channel authentication system 100 may initiate a large number of authentication requests without requiring the user to swipe an identification card, bank card, check card, credit card, or any other card that may be used to authenticate a user 110, thereby allowing increased efficiency and the reduction in the use of card readers for processing.

In another embodiment, components of cross-channel authentication system 100 can obtain information associated with a user 110 from a centralized location rather than processing identification cards and communicating information necessary for the processing of the cards, thereby reducing the computation resources and bandwidth consumed by attempting to obtain such information from traditional physical cards.

FIG. 2 illustrates an example method for cross-channel authentication, which may be performed by the example system of FIG. 1 to authenticate a user, according to certain embodiments of the present disclosure. Example method 200 may be implemented in any suitable combination of software, firmware, and hardware. Although particular components may be identified as performing particular steps, the present disclosure contemplates any suitable components performing the steps according to particular purposes.

Example method 200 may begin at step 202, where user 110 may use user device 120 to request to be authenticated by authentication server 140. For example, user 110 may use GUI 124 to enter user credentials into user device 120. In this example, user 110 may be using a mobile software application running on user device 120 to initiate authentication with an enterprise. User device 120 may communicate at least one user credential to authentication server 140 via link 160 over network 130 requesting authentication for user 110. In response, at step 204, authentication server 140 may use the received information to authenticate user 110. For example, authentication server 140 may use authentication module 144 to determine whether the information received from user device 120 is valid and user 110 may be authenticated. If the information is not valid, authentication server 140 may communicate a message via link 160 over network 130 to user device 120 indicating that user 110 is not authenticated and user 110 may re-enter user credentials and the example method 200 may return to step 202. Otherwise, if the information is valid, authentication server 140 may communicate a message via link 160 over network 130 indicating that user 110 has been authenticated. Example method 200 may proceed to step 206.

Once user 110 is authenticated, user 110 may, at step 206, request a one-time password in order to participate in a transaction using user device 120. In certain embodiments, user 110 may indicate the type of channel or transaction. For example, user 110 may select an ATM as the type of channel for the transaction. User device 120 may communicate user 110's request for a one-time password via link 160 over network 130 to authentication server 140. In certain embodiments, user device 120 may also include information that may identify user 110 or user device 120 in the request. At step 208, in response to receiving the request, authentication server 140 may generate a one-time password. As an example, authentication server 140 may use one-time password module 146 to generate the requested one-time password. At step 210, authentication server 140 may also associate the one-time password with the particular user 110. For example, authentication server 140 may do this by associating the one-time password to a particular user account 148 associated with user 110. In certain embodiments, the one-time password may expire after a defined period of time. In some embodiments, the one-time password may not expire until it is used by user 110. At step 210, authentication server 140 may then communicate the one-time password to user device 120. Example method 200 may then proceed to step 214.

At step 214, after receiving the one-time password, user 110 may desire to facilitate the transaction. For example, user 110 may indicate to transaction device 150 (either directly or via an employee of an enterprise) that user 110 has a one-time password that may authenticate user 110. User 110 may input the one-time password using input component 156 of transaction device 150. For example, user 110 may enter an alphanumeric string by typing on a keypad or may display a QR code on user device 120 that may be analyzed by a scanner or some other visual input device. As another example, user 110 may speak the one-time password to an employee of the enterprise that may confirm one-time password. In certain embodiments, additional information may be inputted into transaction device 150 that is associated with user 110. For example, information associated with user 110 or user device 120 may be entered into transaction device 150 such as a user identifier, device identifier, phone number, and/or any other information suitable for a particular purpose.

Once the attempted one-time password and any other additional information has been entered into transaction device 150, transaction device 150 may communicate this information as part of a request to authenticate a user 110 that is attempting to use the one-time password. The request may be communicated by transaction device 150 via link 160 over network 130 to authentication server 140. In certain embodiments, a digital image or video capture may be included in the communicated request. In other embodiments, the digital image or video capture may be processed into machine-readable data before being included in the communicated request. At step 214, in response to receiving the request, authentication server 140 may determine whether the attempted one-time password is valid. In certain embodiments, authentication server 140 may use authentication module 144 to determine the validity of the attempted one-time password. If it is determined that the one-time password is not valid, authentication server 140 may communicate a message to transaction device 150 indicating that the one-time password is invalid and example method 200 may return to step 214. Transaction device 150 may, in response, prompt user 110 to input a valid one-time password. Otherwise, if it is determined that the one-time password is valid, the example method 200 may proceed to step 218 where the authentication server 140 may communicate a message to transaction device via link 160 over network 130 indicating that the attempted one-time password is valid and that user 110 is authenticated. User 110 may then proceed with the transaction.

FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300) may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An authentication system comprising:
    a memory operable to:
        store a user account identifier associated with a user account, wherein the user account is associated with an enterprise; and
    a processor communicatively coupled to the memory, the memory including executable instructions that upon execution cause the system to:
        receive at least one user credential;
        authenticate the user account based at least in part on the at least one user credential;
        receive a first request after authenticating the user account, from a mobile device associated with the user account, to generate a one-time password;
        generate the one-time password in response to receiving the first request;
        associate the one-time password to the user account;
        communicate the one-time password to the mobile device associated with the user account;
        receive a second request, from a transaction device associated with the enterprise, the second request comprising an attempted one-time password, wherein the transaction device is an automated teller machine (ATM);
        determine whether the attempted one-time password is valid; and
        communicate, to the transaction device, an indication that the attempted one-time password is valid in response to determining that the attempted one-time password is valid.

2. The system of claim 1, wherein the one-time password is a quick response code.

3. The system of claim 1, wherein the one-time password is an alphanumeric string.

4. The system of claim 1, wherein the second request further comprises a mobile device identifier and wherein determining whether the attempted one-time password is valid comprises:
    determining whether the mobile device identifier is associated with the user account; and
    determining whether the attempted one-time password matches the one-time password associated with the user account.

5. The system of claim 4, wherein the mobile device identifier is a phone number.

6. The system of claim 1, wherein the first request comprises information associated with the transaction device.

7. The system of claim 6, wherein the information comprises a transaction channel.

8. An authentication method comprising:
    storing, using a processor, a user account identifier associated with a user account, wherein the user account is associated with an enterprise;

receiving at least one user credential;

authenticating, using the processor, the user account based at least in part on the at least one user credential;

receiving a first request after authenticating the user account, from a mobile device associated with the user account, to generate a one-time password;

generating, using the processor, the one-time password in response to receiving the first request;

associating, using the processor, the one-time password to the user account;

communicating, using the processor, the one-time password to the mobile device associated with the user account;

receiving a second request, from a transaction device associated with the enterprise, the second request comprising an attempted one-time password, wherein the transaction device is an automated teller machine (ATM);

determining whether the attempted one-time password is valid; and communicating, to the transaction device, an indication that the attempted one-time password is valid in response to determining that the attempted one-time password is valid.

9. The method of claim 8, wherein the one-time password is a quick response code.

10. The method of claim 8, wherein the one-time password is an alphanumeric string.

11. The method of claim 8, wherein the second request further comprises a mobile device identifier and wherein determining whether the attempted one-time password is valid comprises:

determining whether the mobile device identifier is associated with the user account; and determining whether the attempted one-time password matches the one-time password associated with the user account.

12. The method of claim 11, wherein the mobile device identifier is a phone number.

13. The method of claim 8, wherein the first request comprises information associated with the transaction device.

14. The method of claim 13, wherein the information comprises a transaction channel.

15. An authentication system comprising:

a memory operable to:
store a user account identifier associated with a user account, wherein the user account is associated with an enterprise; and a processor communicatively coupled to the memory, the memory including executable instructions that upon execution cause the system to:

receive at least one user credential;

authenticate the user account based at least in part on the at least one user credential;

receive a first request after authenticating the user account, from a mobile device associated with the user account, to generate a one-time password;

generate the one-time password in response to receiving the first request, wherein the one-time password comprises a quick response code;

associate the one-time password to the user account;

communicate the one-time password to the mobile device associated with the user account;

receive a second request, from a transaction device associated with the enterprise, wherein the transaction device is an automated teller machine (ATM), the second request comprising:

an attempted one-time password; and a mobile device identifier;

determine whether the attempted one-time password is valid; and communicate, to the transaction device, an indication that the attempted one-time password is valid in response to determining that the attempted one-time password is valid.

16. The system of claim 15, wherein the attempted one-time password is information associated with an attempted quick response code.

17. The system of claim 15, wherein the attempted one-time password comprises an attempted quick response code and the processor is further operable to decode the attempted quick response code.

18. The system of claim 15, wherein determining whether the attempted one-time password is valid comprises:

determining whether the mobile device identifier is associated with the user account and the mobile device; and determining whether the attempted one-time password matches the one-time password associated with the user account.

19. The system of claim 15, wherein the mobile device identifier is a phone number.

20. The system of claim 15, wherein the first request comprises a transaction channel associated with the transaction device.

* * * * *